(12) United States Patent
Schmidt et al.

(10) Patent No.: US 8,230,670 B2
(45) Date of Patent: **\*Jul. 31, 2012**

(54) FLEXIBLE COMBINE HARVESTER DRAPER HEADER WITH PIVOTING STRUCTURE WITHIN SIDE DRAPER

(75) Inventors: James R. Schmidt, Hesston, KS (US); Christopher T. Sauerwein, Newton, KS (US); Randy Lohrentz, Buhler, KS (US); Bernard D. Regier, Newton, KS (US); Stanley R. Clark, Hesston, KS (US); Alan R. Bergkamp, Galva, KS (US)

(73) Assignee: AGCO Corporation, Duluth, GA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/281,564

(22) Filed: Oct. 26, 2011

(65) Prior Publication Data

US 2012/0036819 A1 Feb. 16, 2012

Related U.S. Application Data

(63) Continuation of application No. 13/085,376, filed on Apr. 12, 2011, now Pat. No. 8,096,101, which is a continuation of application No. 12/609,932, filed on Oct. 30, 2009, now Pat. No. 7,926,248, which is a continuation of application No. 12/324,053, filed on Nov. 26, 2008, now abandoned, which is a continuation of application No. 11/670,295, filed on Feb. 1, 2007, now abandoned.

(60) Provisional application No. 60/771,981, filed on Feb. 10, 2006.

(51) Int. Cl.
*A01D 67/00* (2006.01)

(52) U.S. Cl. ........................................................ 56/208
(58) Field of Classification Search .................. 56/208, 56/203, 181, 182, 257, 10.2 E; 198/813
See application file for complete search history.

(56) References Cited

U.S. PATENT DOCUMENTS

| | | | | |
|---|---|---|---|---|
| 1,932,717 A * | 10/1933 | Wickersham | | 56/11.2 |
| 1,938,263 A * | 12/1933 | Templeton | | 56/192 |
| 1,996,294 A * | 4/1935 | Hume et al. | | 56/181 |
| 2,099,471 A * | 11/1937 | Edgington | | 56/312 |
| 2,438,065 A * | 3/1948 | Love | | 56/303 |
| 2,667,728 A * | 2/1954 | Dray | | 56/181 |
| 3,324,638 A * | 6/1967 | Koch et al. | | 56/14.5 |
| 4,590,751 A * | 5/1986 | Stephenson | | 56/192 |
| 5,464,371 A * | 11/1995 | Honey | | 460/20 |
| RE35,543 E * | 7/1997 | Patterson | | 56/14.4 |
| 6,351,931 B1 * | 3/2002 | Shearer | | 56/181 |
| 6,675,568 B2 * | 1/2004 | Patterson et al. | | 56/208 |
| 7,191,582 B2 * | 3/2007 | Bomleny | | 56/10.2 E |
| 7,207,164 B2 * | 4/2007 | Bomleny | | 56/10.2 E |
| 7,222,475 B2 * | 5/2007 | Bomleny et al. | | 56/10.2 E |
| 7,373,769 B2 * | 5/2008 | Talbot et al. | | 56/303 |
| 7,412,816 B2 * | 8/2008 | Coers et al. | | 56/208 |

(Continued)

*Primary Examiner* — Arpad Fabian-Kovacs
(74) *Attorney, Agent, or Firm* — Hovey Williams LLP

(57) ABSTRACT

A harvesting header includes a header frame, a flexible cutterbar assembly, and a plurality of laterally spaced apart support arms that are attached to and cooperatively support the flexible cutterbar assembly. The header also includes a draper assembly with a side draper carried on multiple ones of the support arms so as to flex with the cutterbar assembly. The side draper includes an endless flexible draper belt presenting laterally endmost margins, with upper and lower crop-conveying runs extending between the margins. The header further includes pivoting structure mounted relative to the header frame at a rear pivot location so that the pivoting structure projects forwardly from the rear pivot location.

24 Claims, 18 Drawing Sheets

U.S. PATENT DOCUMENTS

| | | | |
|---|---|---|---|
| 7,430,846 B2 * | 10/2008 | Bomleny et al. | 56/10.2 E |
| 7,472,533 B2 * | 1/2009 | Talbot et al. | 56/181 |
| 7,549,280 B2 * | 6/2009 | Lovett et al. | 56/208 |
| 7,926,248 B2 * | 4/2011 | Schmidt et al. | 56/181 |
| 8,051,633 B2 * | 11/2011 | Figgins et al. | 56/181 |
| 2002/0129591 A1 * | 9/2002 | Patterson et al. | 56/158 |
| 2003/0074876 A1 * | 4/2003 | Patterson et al. | 56/257 |
| 2004/0065069 A1 * | 4/2004 | Dunn et al. | 56/10.4 |
| 2007/0193243 A1 * | 8/2007 | Schmidt et al. | 56/181 |
| 2008/0072560 A1 * | 3/2008 | Talbot | 56/208 |
| 2008/0078155 A1 * | 4/2008 | Coers et al. | 56/15.8 |
| 2009/0094957 A1 * | 4/2009 | Schmidt et al. | 56/182 |
| 2009/0266044 A1 * | 10/2009 | Coers et al. | 56/208 |
| 2011/0185693 A1 * | 8/2011 | Schmidt et al. | 56/181 |

* cited by examiner

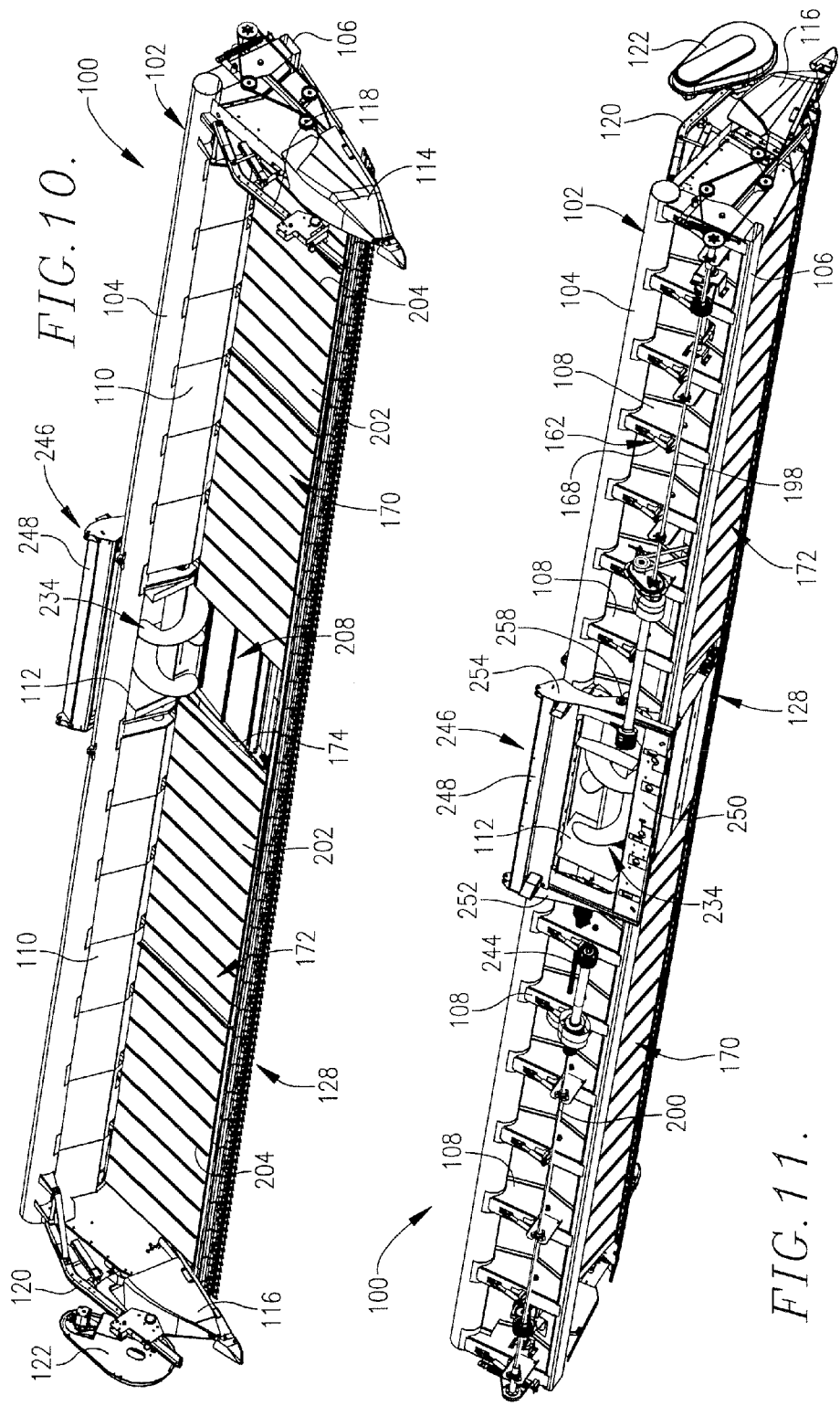

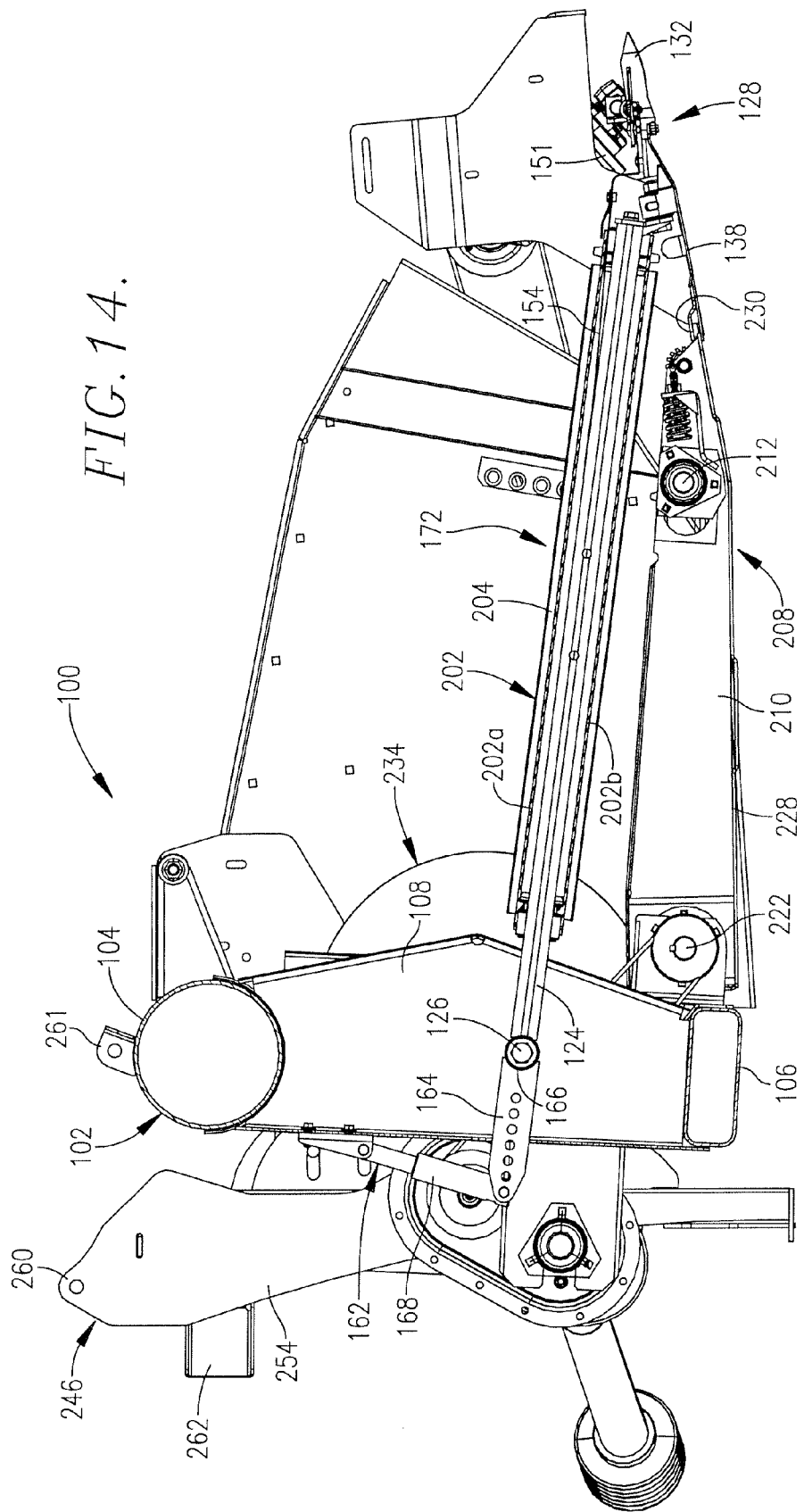

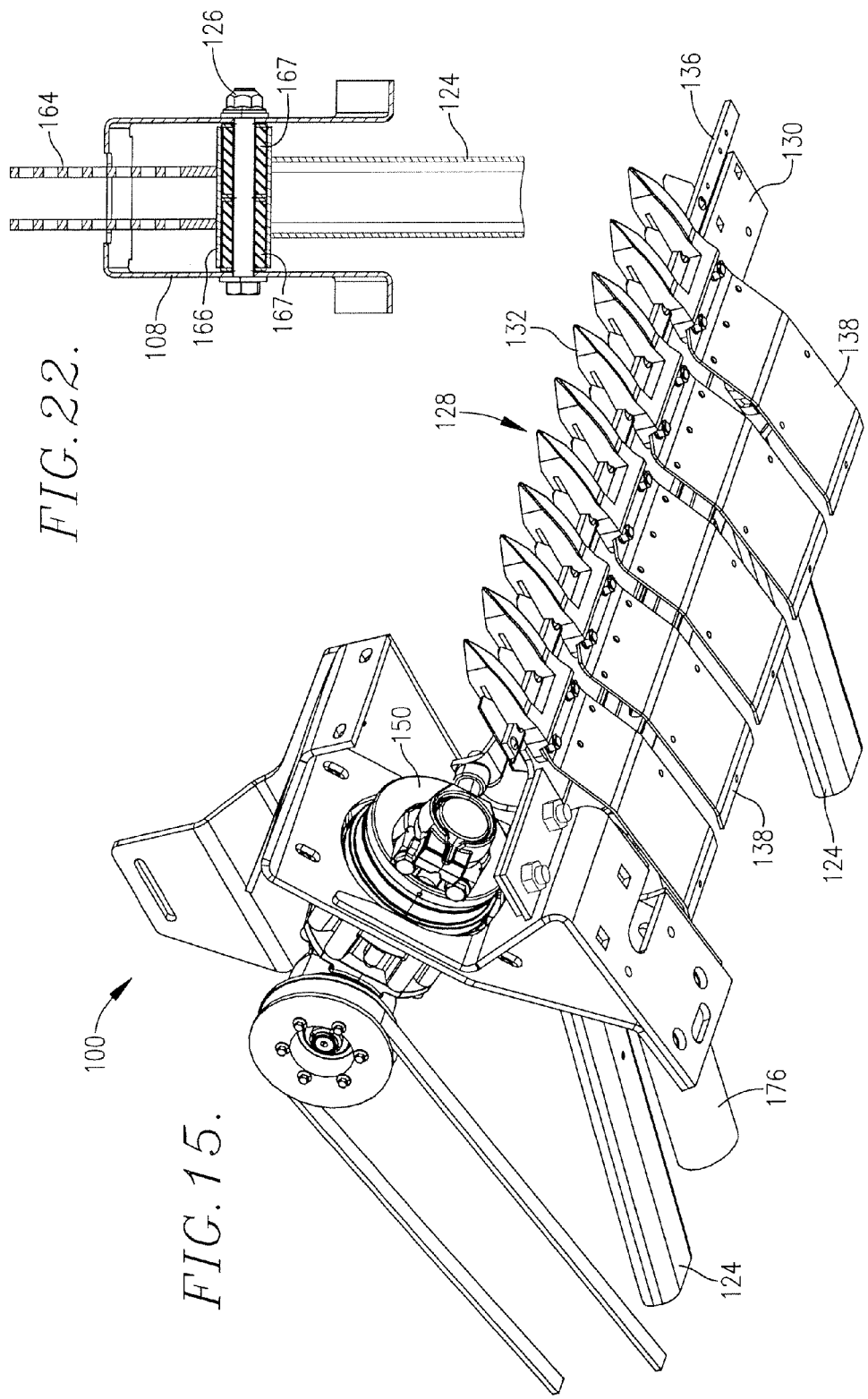

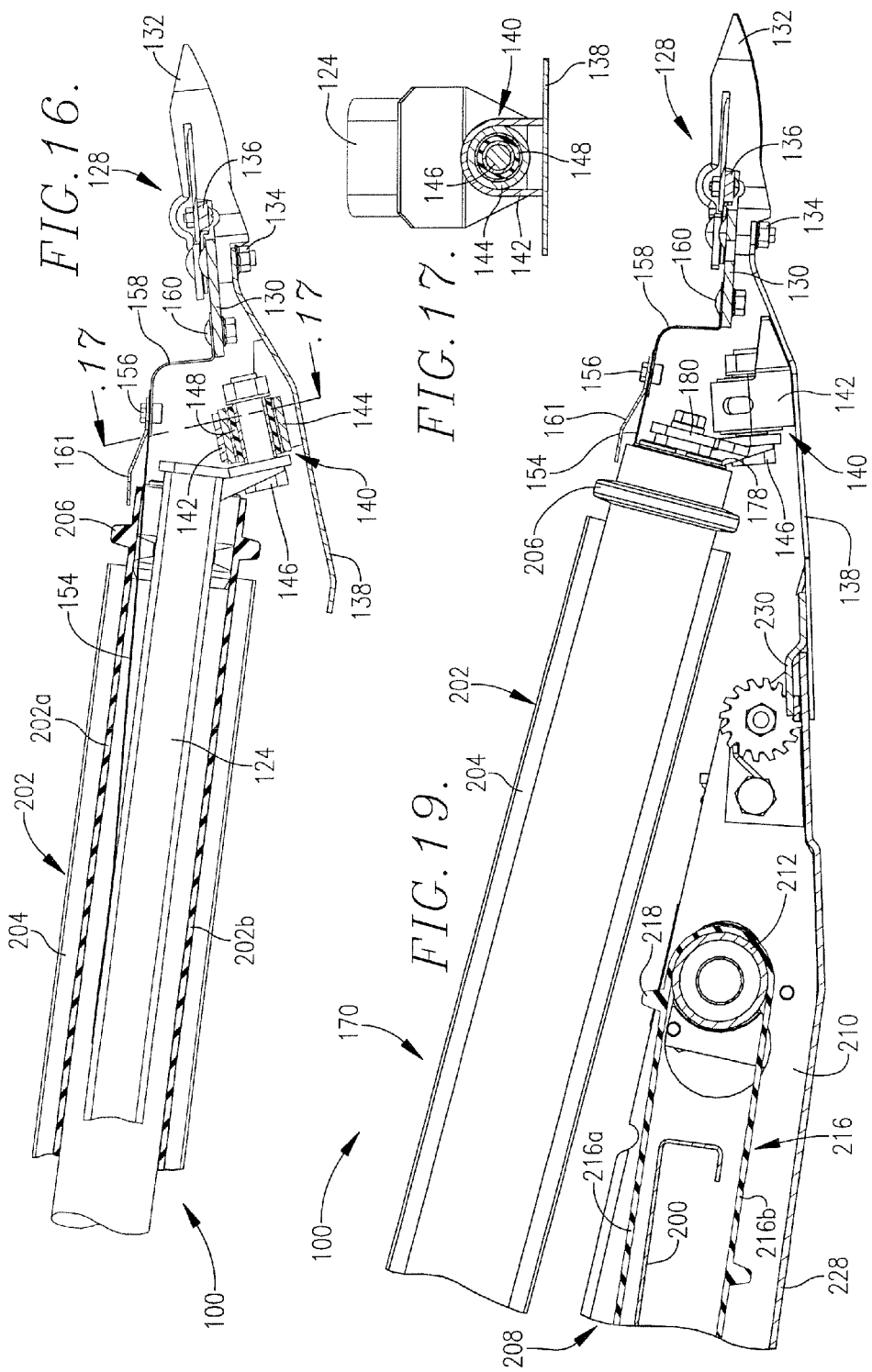

FLEXIBLE COMBINE HARVESTER DRAPER HEADER WITH PIVOTING STRUCTURE WITHIN SIDE DRAPER

RELATED APPLICATION

This application is a continuation of U.S. application Ser. No. 13/085,376, filed Apr. 12, 2011, which is a continuation of U.S. application Ser. No. 12/609,932, filed Oct. 30, 2009, which is a continuation of U.S. application Ser. No. 12/324, 053, filed Nov. 26, 2008, which is a continuation application that is related to and claims the priority benefit of prior U.S. application Ser. No. 11/670,295, filed Feb. 1, 2007, which claims priority of prior Provisional Application No. 60/771, 981, filed Feb. 10, 2006, all of which are hereby incorporated by reference into the present specification.

TECHNICAL FIELD

This invention relates to harvesting equipment and, more particularly, to a draper header adapted for attachment to a combine harvester wherein the header is provided with a flexible cutterbar.

BRIEF DESCRIPTION OF THE DRAWINGS

FIG. 10 is a left, front isometric view of an alternative embodiment of a draper header having a flexible cutterbar and flexible draper in accordance with the principles of the present invention;

FIG. 11 is a right, rear isometric view thereof;

FIG. 14 is a transverse cross-sectional view through the header of FIG. 10 similar to FIG. 13 but showing the header in a fully raised position;

FIG. 15 is a fragmentary, bottom isometric view of the right end of the cutterbar assembly showing details of construction;

FIG. 16 is an enlarged, fragmentary, transverse cross-sectional view through the front of the header of FIG. 10 illustrating the relationship between the draper assembly and the cutterbar assembly;

FIG. 17 is a cross-sectional view through the attachment coupling between the front end of the draper assembly and the proximal ground skid taken substantially along line 17-17 of FIG. 16;

FIG. 19 is an enlarged, fragmentary cross-sectional view similar to FIG. 18 with the header fully lowered;

FIG. 22 is an enlarged, fragmentary cross-sectional view of one of the upright mounting members of the header frame and associated support arms of the header of FIG. 10.

DETAILED DESCRIPTION

Figure 1:
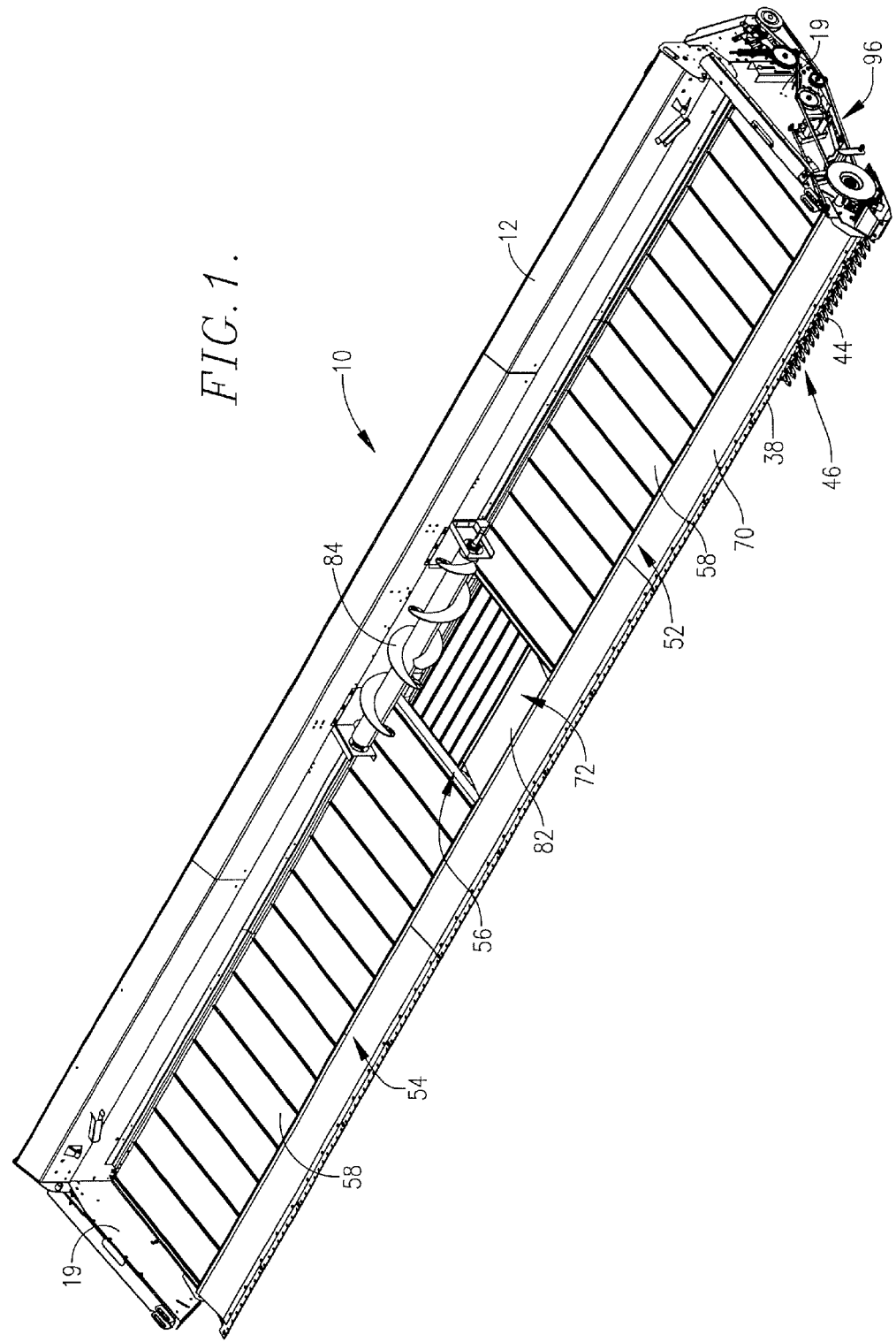
FIG. 1 is a left front isometric view of an embodiment of a draper header having a flexible cutterbar in accordance with the principles of the present invention.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the rear of the machine looking forwardly.

Header 10 has a frame at the rear thereof that includes an upper beam assembly 12 extending across the entire width of header 10, and a lower beam assembly 14 that likewise extends across the full width of header 10. A number of upright channels 16 interconnect beam assemblies 12, 14 across the backside of header 10 at spaced locations thereacross. Upright rear panels 18 on the front sides of channels 16 define an upright rear wall of the header, while a centrally located opening 20 in such panels serves as a crop outlet from header 10 to the feeder housing (not shown) of a combine harvester upon which header 10 may be mounted. Header 10 is also provided with left and right end panels 19.

Figure 5:
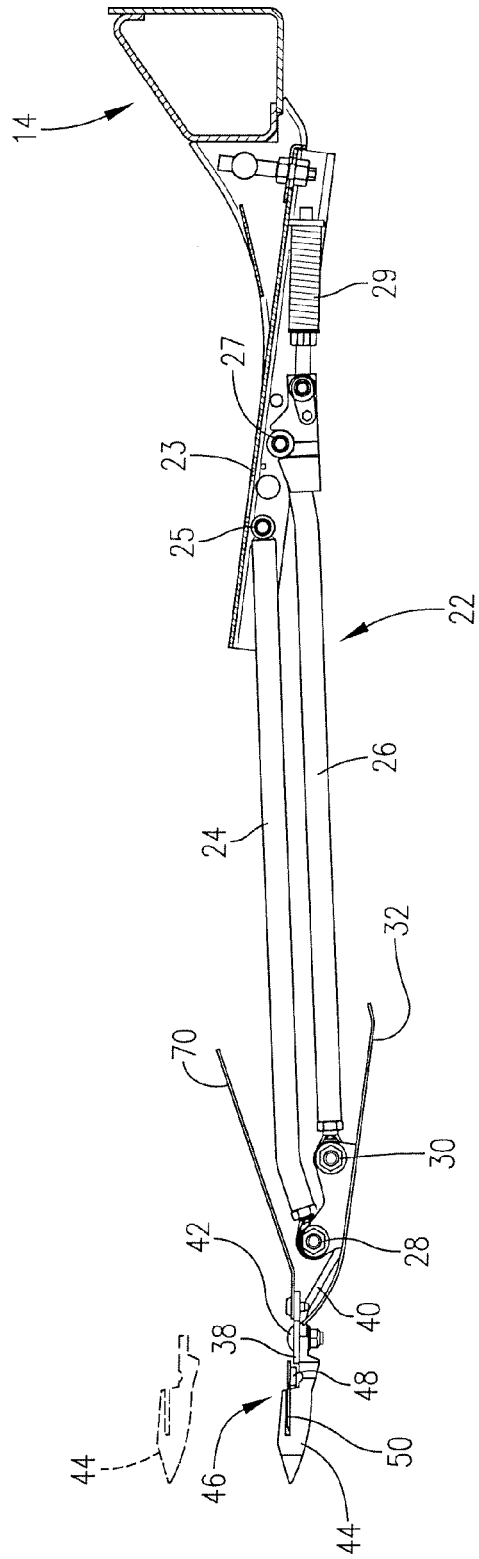
FIG. 5 is a fragmentary fore-and-aft cross-sectional view through the header illustrating the four-bar arm supporting linkage for the cutterbar.

Lower beam assembly 14 carries a number of arm assemblies 22 that project forwardly from beam assembly 12 at spaced locations along the length thereof. Each arm assembly 22 could comprise a single arm or, in another form of the invention as shown, a four-bar linkage having an upper link 24 and a lower link 26 that are respectively connected at their front ends by pivots 28 and 30 to a skid plate 32. Links 24, 26 are pivotally connected at their rear ends to support assemblies 23 by rear pivots 25 and 27, respectively (FIG. 5). Arm assemblies 22 are biased yieldably upwardly by suitable biasing means, which in the illustrated embodiment comprises a compression spring assembly 29 (FIG. 5).

Figure 4:
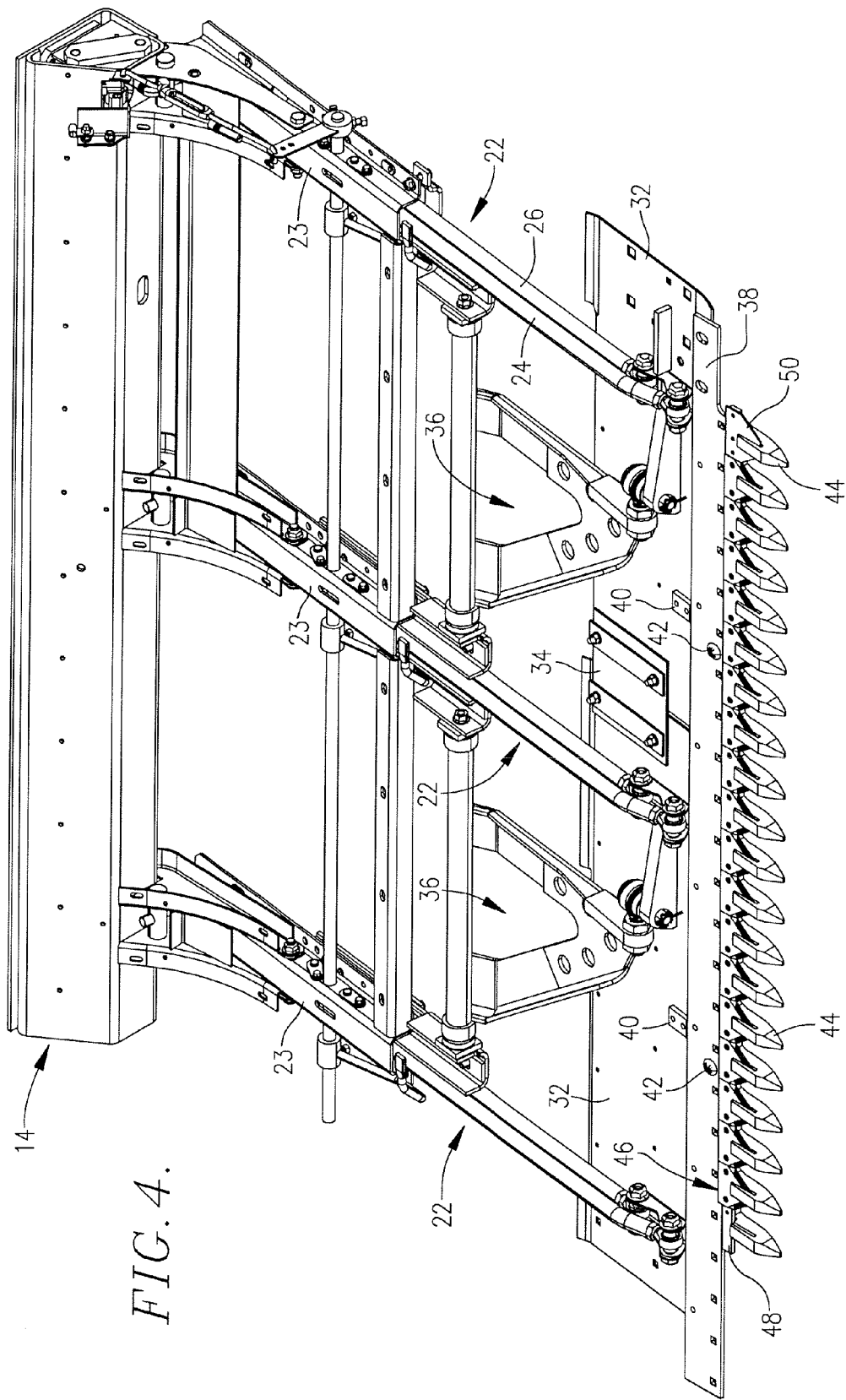
FIG. 4 is a fragmentary, front isometric view of a portion of the left end of the header illustrating details of construction.

In some instances, such as at the opposite ends of the header 10, only a single one of the arm assemblies 22 is attached to a skid plate 32, while in other portions of the header two or more of the arm assemblies 22 may be attached to a single skid plate 32. As illustrated in FIG. 4, adjacent ones of the skid plates 32 are hingedly interconnected by a web 34 of flexible material that spans the interface between adjacent skid plates 32 and is secured to such skid plates by suitable fasteners. A-frame assemblies 36 (FIG. 4) are provided in association with the two leftmost skid plates 32 to assist in providing structural support for sickle drive mechanism as hereinafter described.

A continuous, full length, flexible cutterbar 38 constructed of flat plate metal extends across the front of header 10 for its full width. Cutterbar 38 is secured to the front extremities of skid plates 32 by mounting lugs 40. Carriage bolts 42 at the front ends of lugs 40 attach the same to cutterbar 38, while the rear ends of lugs 40 are secured to skids 32 by suitable fastening means not shown.

A series of side-by-side sickle guards 44 are bolted to the front edge of cutterbar 38 and project forwardly therefrom along the full length cutterbar 38. A representative number of sickle guards 44 are illustrated on the cutterbar 38 in FIG. 1. A reciprocating sickle assembly 46 is carried by guards 44 for severing standing crop materials from the ground as header 10 is advanced.

Header 10 may be provided with either a single such full-length sickle assembly 46 or with a split sickle assembly comprising two separate sickle assemblies that are driven by two separate mechanisms at opposite ends of header 10. As is well known in the art, sickle assembly 46 may include a generally rectangular in cross section sickle bar 48 on which are secured a number of side-by-side knife sections 50.

Figure 6:
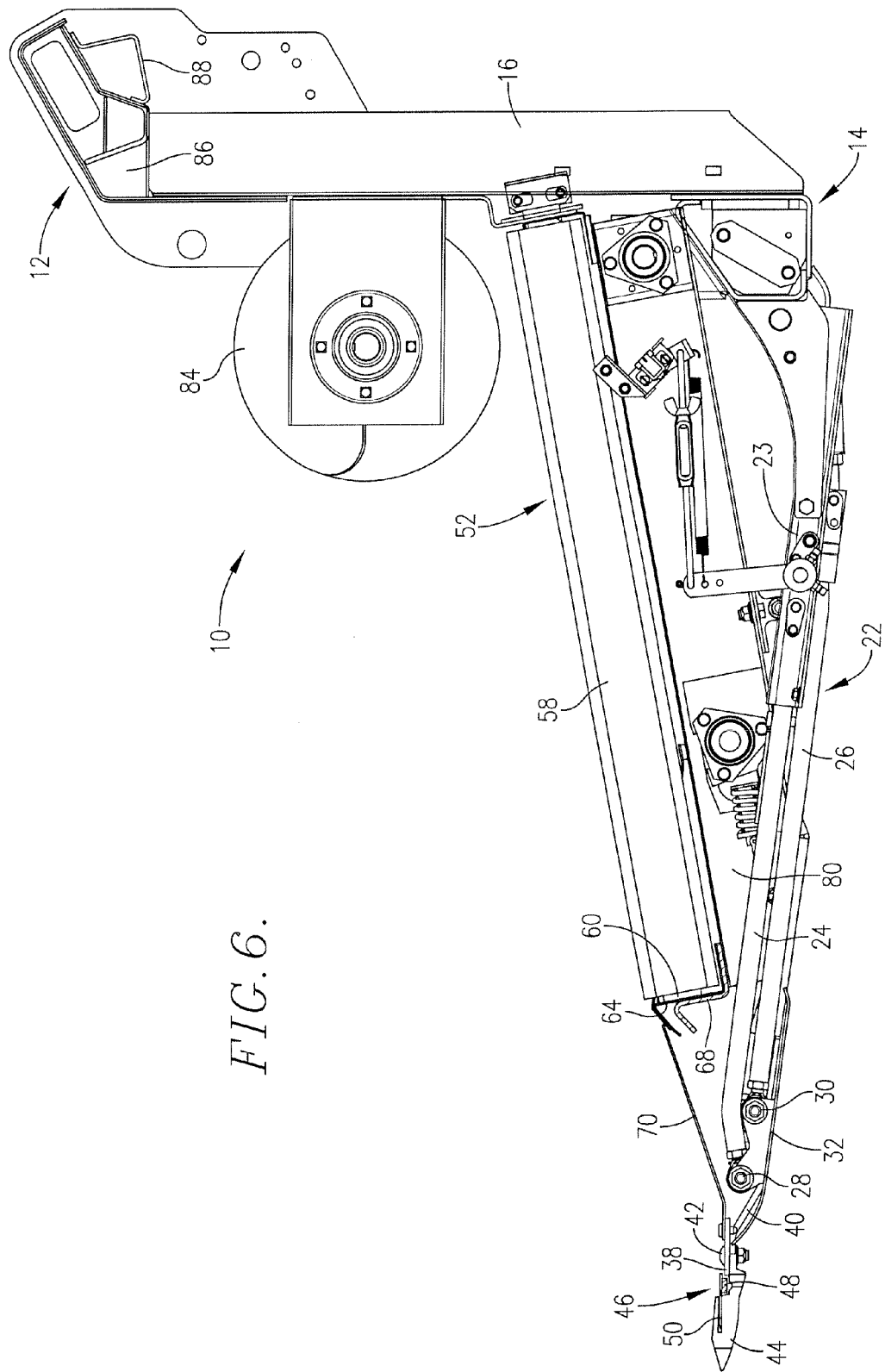
FIG. 6 is a left end elevational view of the header with drive mechanism and the end panel removed to reveal details of construction.

A pair of left and right, center delivery draper assemblies 52 and 54 are located behind cutterbar 38 in disposition for receiving severed crop materials from sickle assembly 46 and moving such materials toward the center of header 10. Drapers 52, 54 are spaced apart near the center of header 10 to define a generally rectangular in plan receiving opening 56 for crop materials from drapers 52, 54. Each draper assembly 52, 54 comprises a wide, flat, endless draper belt that is looped around a pair of fore-and-aft rollers at opposite ends of the assembly. FIG. 6 illustrates such a draper belt 58 wrapped around an outboard roller 60 at one end of the endless belt 58. The other, inboard roller of left draper assembly 52 is not visible in the drawings, but such an inboard roller 62 is visible in FIG. 7 in connection with right draper assembly 54. Each pair of rollers 60, 62 is supported at its front end by a formed, generally Z-shaped, transversely extending member 64 and at its rear end by a transversely extending formed member 66 secured to the rear frame of header 10. In addition, header 10 has a full width, generally Z-shaped support channel 68 extending the full width of header 10. A feather plate 70, which may be constructed in one or more sections, is attached to the rear edge of cutterbar 38 and extends upwardly and rearwardly therefrom to provide a transition for severed crop materials from sickle assembly 46 to drapers 52 and 54. The rear extremity of feather plate 70 is supported on a forwardly projecting portion of the Z-shaped support member 64 of each draper assembly 52, 54.

Figure 9:
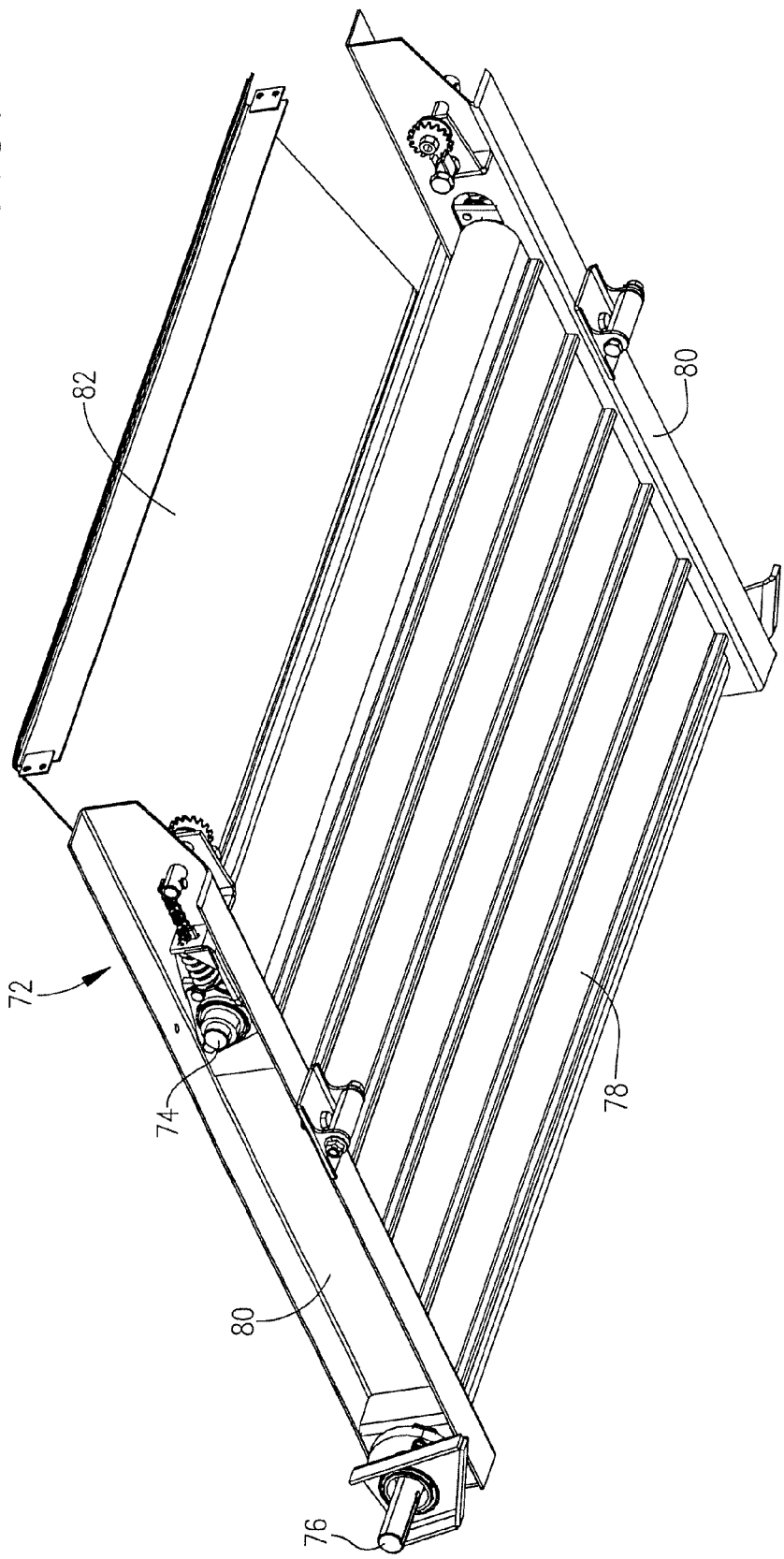
FIG. 9 is a bottom, right front isometric view of the center draper.

A relatively short, center draper assembly 72 is disposed within receiving opening 56 for taking delivery of severed materials from left and right draper assemblies 52 and 54 and feeding the materials upwardly and rearwardly through central opening 20 into the feederhouse of the combine harvester. As illustrated particularly in FIGS. 7 and 9, center draper assembly 72 includes a pair of transversely extending rolls 74 and 76 that are spaced apart in a fore-and-aft direction and are wrapped by an endless draper belt 78. Preferably, draper belt 78 is slatted, as are the draper belts 58 of left and right draper assemblies 52, 54. A pair of laterally spaced apart, fore-and-aft extending channels 80 support the rolls 74, 76 and are, in turn, supported at their rear ends by lower beam assembly 14 and at their front ends by transverse support channel 68. A downwardly and rearwardly inclined ramp plate 82 leads from the rear extremity of feather plate 70 in the region of receiving opening 56 into overlapping relationship with the front extremity of center draper 72 for assisting in guiding materials that have been severed by the central portion of sickle assembly 46 into the center draper assembly 72. A center-gathering auger 84 spans receiving opening 56 above the latter and in front of discharge opening 20 at the rear of center draper assembly 72 for consolidating crop materials from draper assemblies 52, 54 and 72 into a relatively low profile mat that can be handled by the conveying mechanism of the feederhouse into which the materials are fed.

Header 10 is preferably adapted to be attached directly to the front end of the feederhouse of a combine harvester. However, one alternative embodiment would be for header 10 to be mounted upon an adapter which is, in turn, attached to the feederhouse. Such an adapter would have its own center draper, as well as overhead auger, in which event the center draper 82 and overhead auger 84 associated with header 10 of the present invention would not be utilized. It is also contemplated that a draper header may be connected directly to the feederhouse and have a rigid cutterbar rather than a flexible cutterbar.

Figure 3:
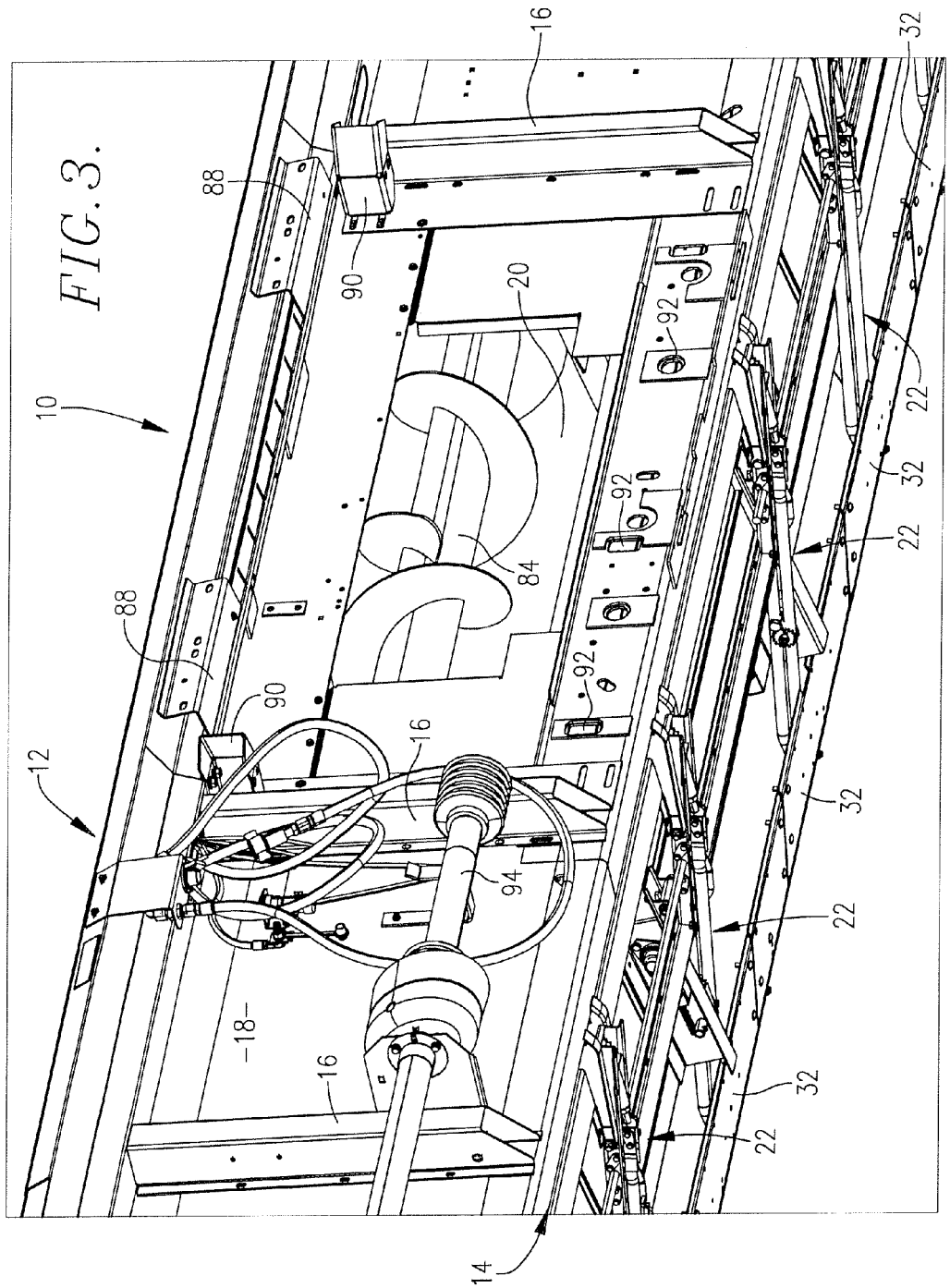
FIG. 3 is a fragmentary, rear isometric view of the header.
Figure 7:
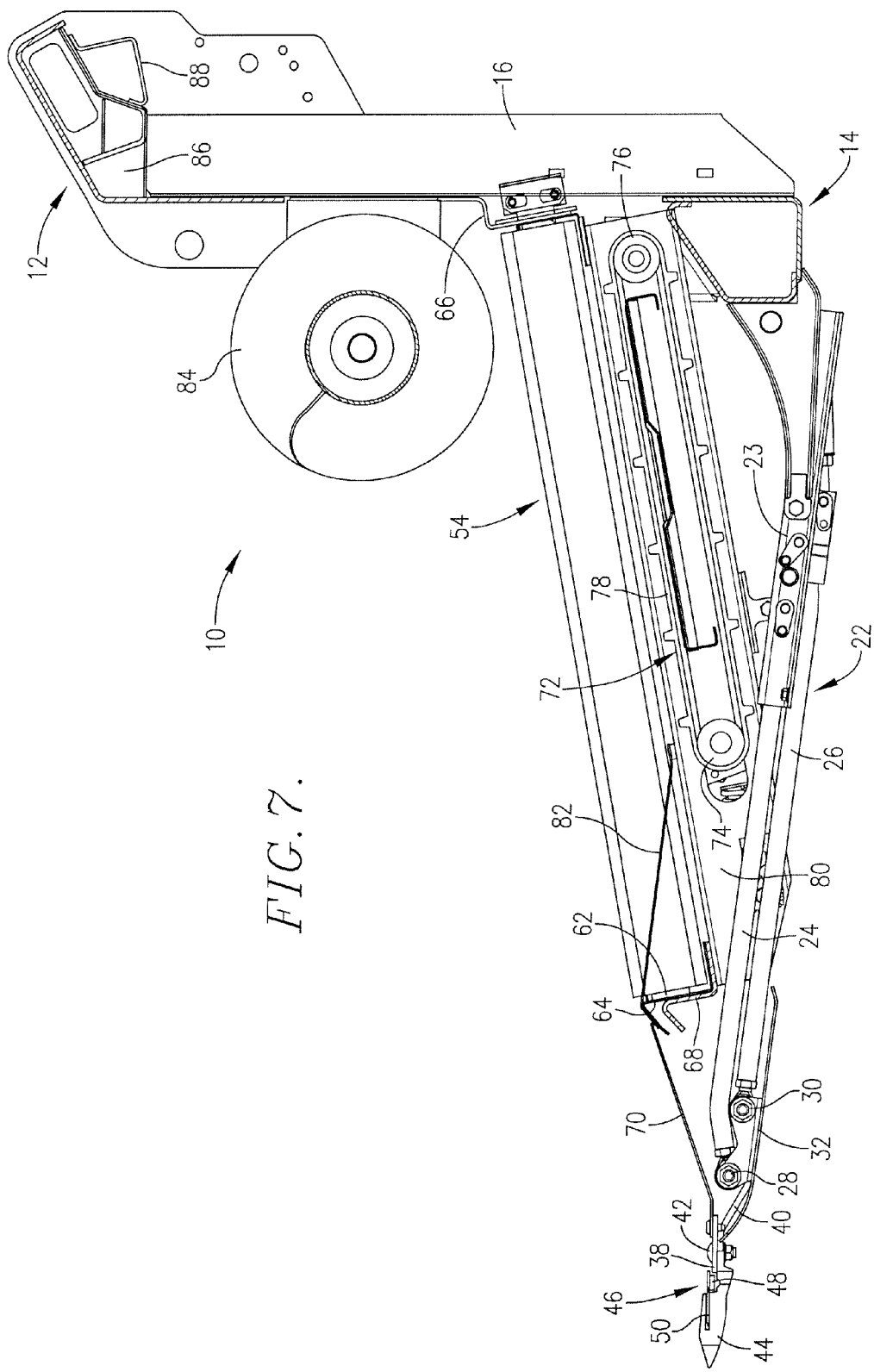
FIG. 7 is a fore-and-aft cross-sectional view through the central portion of the header showing the center draper thereof.
Figure 8:
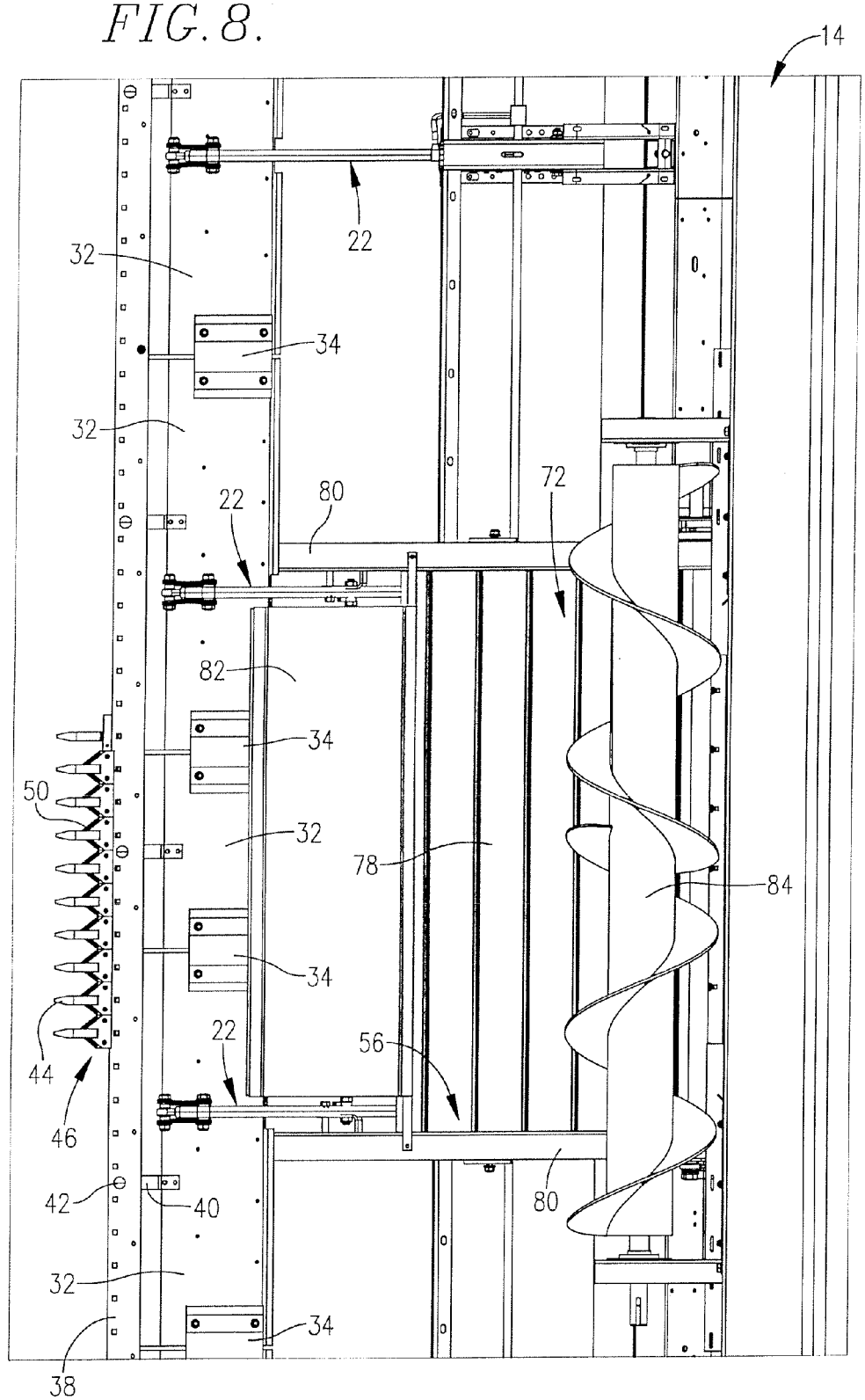
FIG. 8 is a fragmentary top plan view of the central portion of the header with structure removed to reveal details of construction.

As illustrated in FIGS. 6 and 7, upper beam assembly 12 is provided with downwardly opening mounting pockets 86 that are adapted to matingly receive corresponding upwardly projecting mounting structure on the feederhouse. Rests 88 on top beam assembly 12 are disposed rearwardly adjacent pockets 86 for engaging top surface structure on the feederhouse to assist in supporting header 10 on the combine harvester. A pair of rearwardly projecting guides 90 (FIG. 3) are disposed adjacent rests 88 and slightly outboard therefrom for the purpose of embracing opposite sides of the feederhouse and aligning central opening 20 with the mouth of the feederhouse. Multiple sets of receiving sockets 92 are disposed below central opening 20 in association with lower beam assembly 14 for receiving mounting projections on the feederhouse in an arrangement that depends upon the particular brand of combine harvester to which header 10 is mounted.

Figure 2:
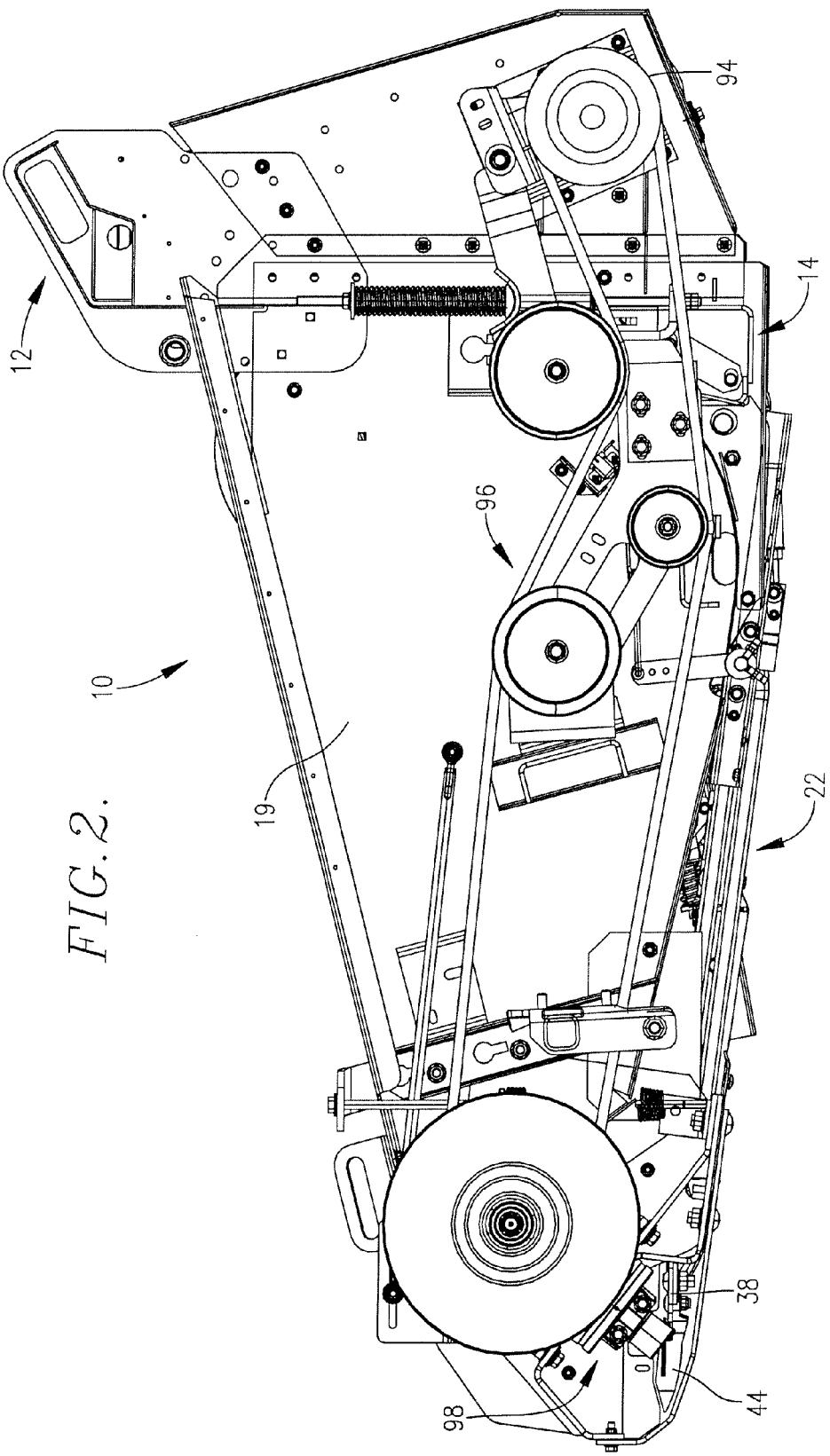
FIG. 2 is a left side elevational view thereof.

The operating components of header 10 may be driven in any number of suitable ways. A variety of different mechanical and/or hydraulic drive systems could be utilized. In the particular illustrated embodiment, a transverse jackshaft 94 (FIG. 3) at the rear of header 10 receives input driving power in an appropriate manner from the combine harvester upon which header 10 is mounted. Driving power from jackshaft 94 is brought to the front of the machine by a belt and pulley assembly 96 on left end panel 19, which assembly 96 is operably coupled with a suitable mechanical sickle drive mechanism 98 as illustrated in FIG. 2. Sickle drive mechanism 98 is drivingly coupled with sickle assembly 46. Although not illustrated herein, it will be understood that draper assemblies 52, 54 and 72, as well as overhead auger 84, may be hydraulically or mechanically driven by suitable drive systems.

Operation

It is contemplated that in most operations header 10 will ride lightly along the ground with skids 32 engaging the surface of the ground. Suitable flotation springs (not shown) are preferably coupled with the feederhouse in such a way that the combined weight of the feederhouse and header 10 is carried in large measure by such flotation springs. Hydraulic means may be utilized in lieu of mechanical springs. On the other hand, if an adapter is used between the feederhouse and header 10, such adapter may be attached rigidly to the feederhouse and the flotation means provided between the adapter and the header. It is also contemplated that header 10 might be locked in an elevated position off the ground for harvesting crops that do not require the sickle assembly 46 to sever the materials close to the ground.

Assuming that header 10 is in its flotation mode rather than locked up for more elevated severance, skids 32 ride along the surface of the ground. As changes in terrain are encountered by different ones of the skids 32, their respective support arm assemblies 22 swing downwardly or upwardly as the case may be to maintain the skid in contact with the ground. Cutterbar 38 flexes as necessary to accommodate such upward or downward ground-hugging action, as does sickle assembly 46, without interfering with the reciprocating motion of sickle assembly 46 and the effective cutting action occurring between knife sections 50 and guards 44. A typical range of flexing motion is illustrated in FIG. 5.

As the crop materials are severed by sickle assembly 46, they fall onto the drapers 52 and 54 to be delivered centrally in a gentle manner to receiving opening 56 and onto rearwardly moving center draper 72. Although the particular disclosed embodiment contemplates that the front extremity of side drapers 52 and 54 will remain stationary relative to the flexing cutterbar 38, it is within the principles of the present invention that the front extremities of side drapers 52 and 54 may likewise flex along with proximal portions of cutterbar 38.

As a result of the construction as herein above described, crops such as soybeans which require severance at the base of the plants can be readily handled by header 10. Furthermore, once severed from the ground, they will be gently consolidated by drapers 52, 54 and 72 and presented to the feederhouse of the combine harvester for further processing. It will be appreciated that although not shown in the drawings, header 10 may be provided with an overhead reel for assisting in gently sweeping the crop materials into and against the reciprocating sickle 46 for severance.

Alternative Embodiment

FIGS. 10-22 disclose details of a header 100 wherein the left and right draper assemblies, as well as the center conveyor assembly, flex up and down with the cutterbar assembly. Referring initially to FIGS. 10 and 11, header 100 has an upright frame 102 at the rear thereof that includes an upper, transverse beam 104 extending across the entire width of header 100, and a lower, transverse beam 106 that is likewise full length and extends across the full width of header 100. A plurality of upright frame members 108 interconnect beams 104, 106 at spaced locations across the back of header 100. Upright panels 110 are secured to the front edges of members 108 to define an upright rear wall of header 100. A centrally located opening 112 between a pair of the inboard upright frame members 108 serves as a crop outlet from header 100 to a combine feederhouse (not shown) upon which header 100 may be mounted. Header 100 is also provided with left and right end panel assemblies 114 and 116 respectively.

A pair of left and right support arms 118, 120 project forwardly from upper beam 104 adjacent opposite ends thereof for supporting a harvesting reel (not shown for clarity) in overlying relationship to the front edge of header 100. The reel is adjustably shiftable fore-and-aft along arms 118 as well understood by those skilled in the art and is driven by a drive assembly 122 carried on right arm 120.

Figure 12:
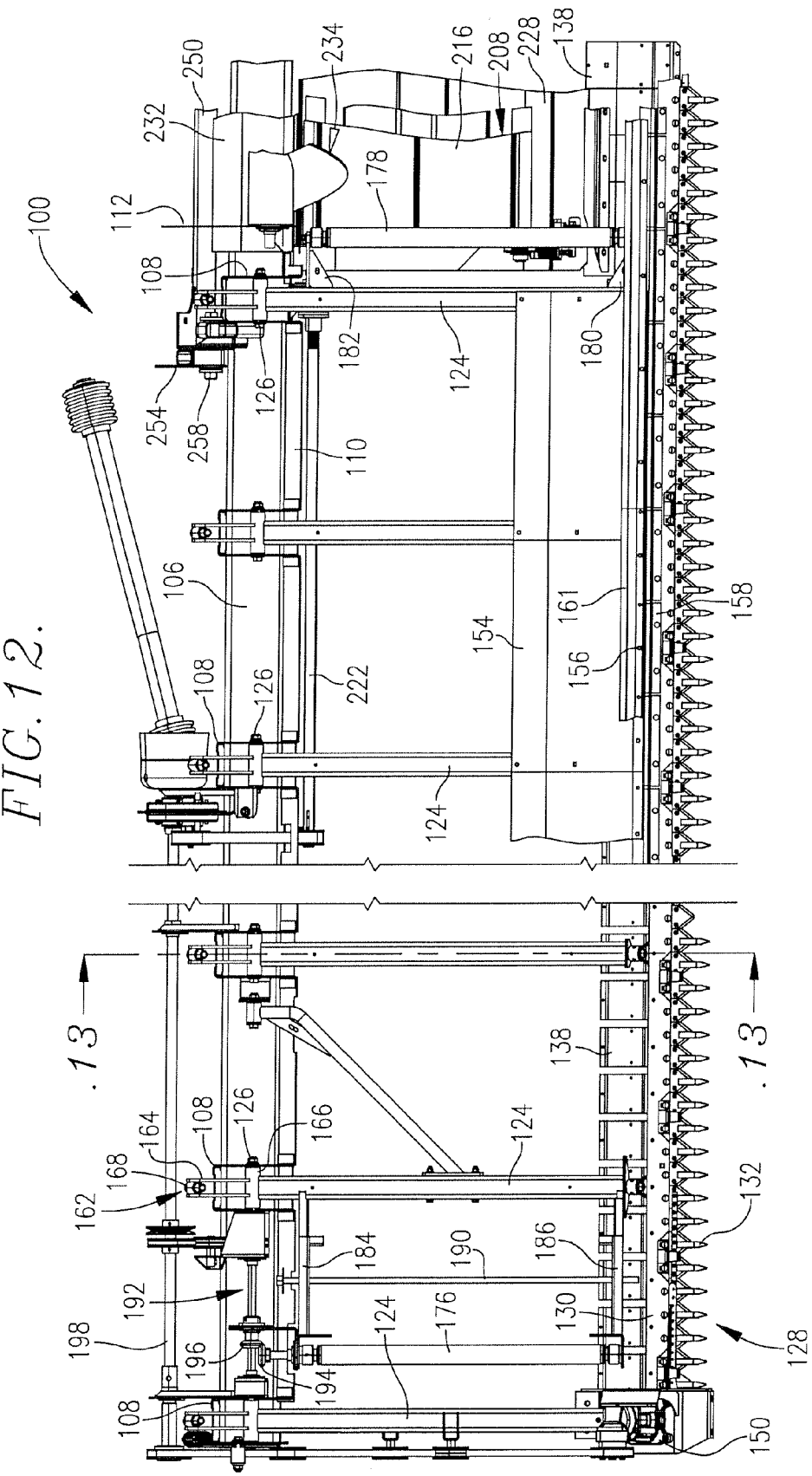
FIG. 12 is a fragmentary, top plan view of the header of FIG. 10 with portions of the header removed and broken away to reveal details of construction.

Referring now to FIG. 12 and others, each upright frame member 108 has an arm 124 pivotally attached thereto about a transverse pivot 126 (see also FIG. 22) and projecting forwardly therefrom to the front extremity of the header. At their front ends, arms 124 are coupled with a flexible cutterbar assembly 128 that extends the full width of the header and is adapted for severing standing crop materials from the ground while also flexing along its length to accommodate changes in the terrain as encountered by different portions of the header. By virtue of their pivots 126, arms 124 are adapted to swing up and down with cutterbar assembly 128 as it flexes during harvesting operations.

Figure 13:
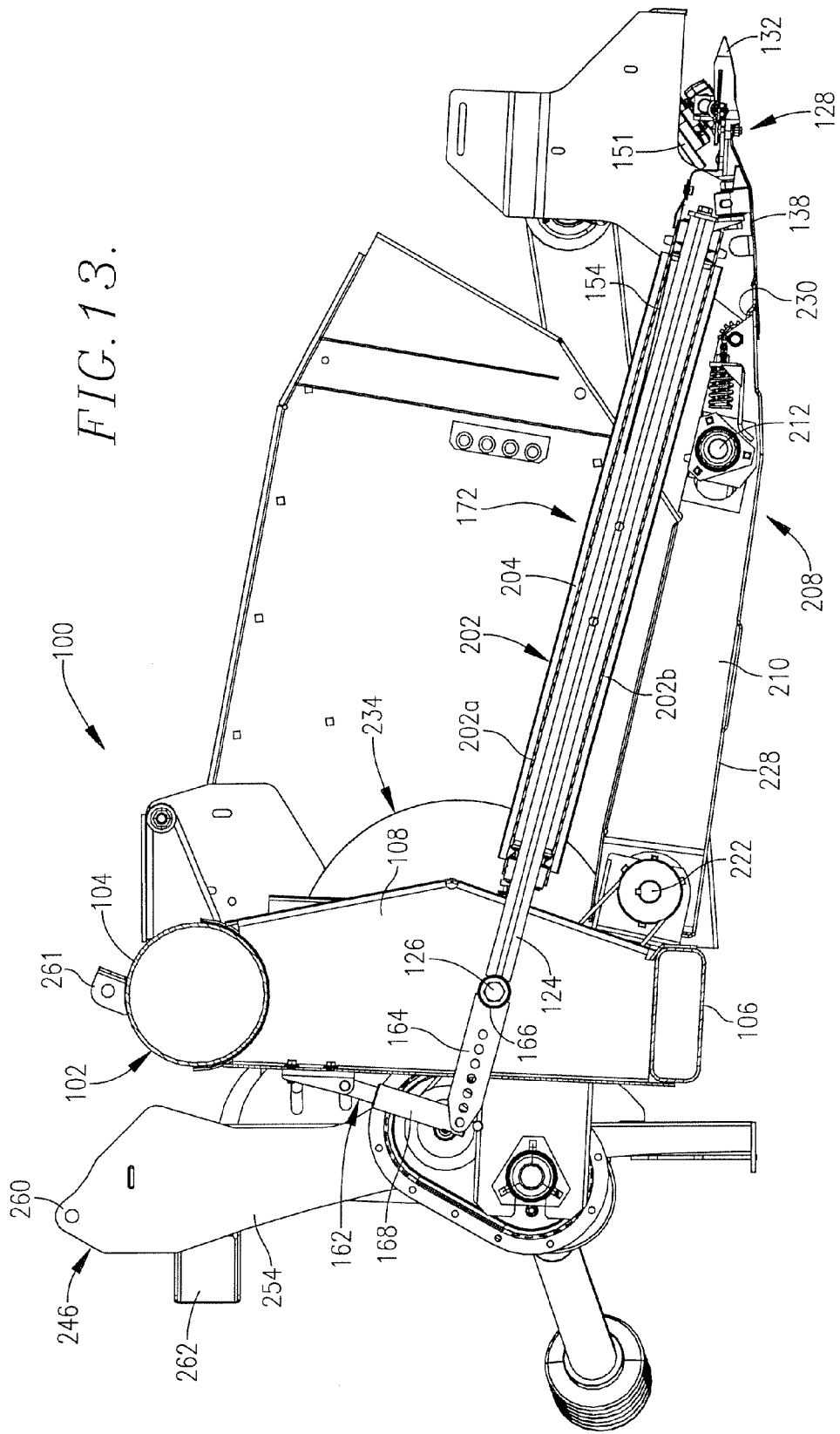
FIG. 13 is a transverse cross-sectional view through the header of FIG. 10 taken substantially along line 13-13 of FIG. 12 with the header in a fully lowered position.
Figure 18:
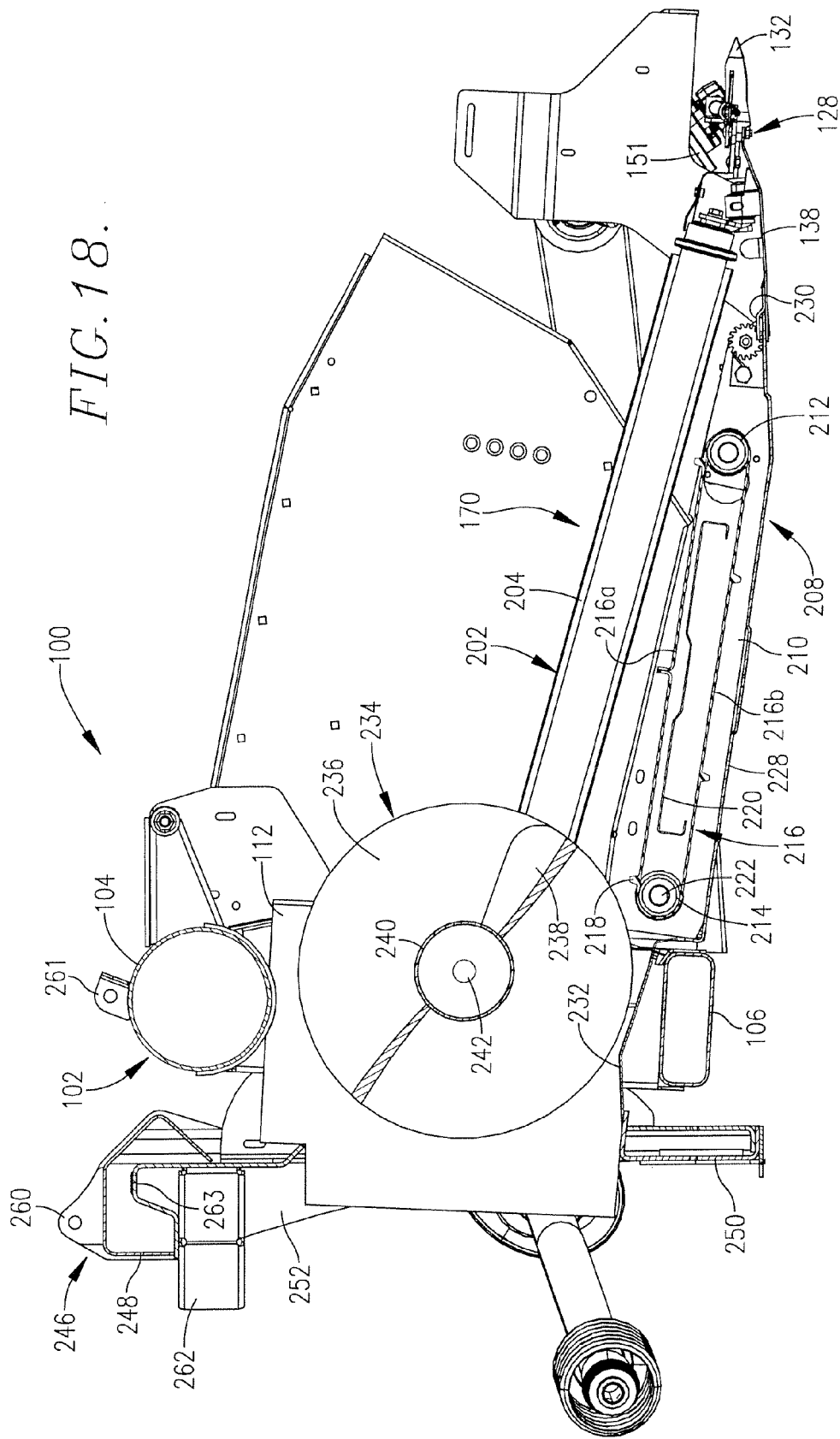
FIG. 18 is a transverse cross-sectional view through the header of FIG. 10 taken along a sight line passing through the central conveyor thereof and showing the header fully lowered.

Cutterbar assembly 128 includes a long, flat cutterbar 130 extending across the full width of header 100 and capable of flexing along its length. Cutterbar 130 has a series of sickle guard assemblies 132 bolted thereto along its front edge by bolts 134 for reciprocably supporting either a single, full-length sickle bar 136 or a double sickle comprising a pair of half-length sickle bars that extend only approximately one-half the width of the header and overlap in the center, all in a well-known manner. In the particular illustrated embodiment, a double sickle is illustrated, with each sickle bar 136 being driven by its own separate drive mechanism at one end of the header. The right sickle bar half has its own drive 150 (FIGS. 12 and 15), while the left sickle bar half has its own separate drive 151 (FIGS. 13, 14 and 18). As is well known, the sickle bars 136 are provided with knife sections that cooperate with the guard assemblies 132 to sever standing crop as the header advances through the field.

Cutterbar assembly 128 also includes a transversely extending series of fore-and-aft ground-engaging skids 138 across the width of header 100 that are connected at their front ends with guard assemblies 132 via the bolts 134. Skids 138 extend rearwardly and downwardly from their connection points with the guard assemblies 132 and underlie the front ends of support arms 124. Skids 138 are slightly spaced apart along the length of the header as shown in FIG. 12 so as to assure their independent movement relative to one another as changes in terrain are encountered across the width of the header. Flexible hinging webs (not shown) may be used to interconnect adjacent skids 138 if desired.

Each arm 124 is connected at its forward end with a corresponding skid 138 by a coupling 140 (shown in detail in FIGS. 16 and 17), which serves as the means by which arms 124 are connected to cutterbar assembly 128. Each coupling 140 includes a mounting component 142 fixed to the corresponding skid 138 and having an inverted, U-shaped looped body portion having a rigid collar 144 fixed interiorly thereof. Coupling 140 further includes a pivot bolt 146 projecting forwardly from the front end of the corresponding arm 124 and received within the recess or bore of collar 144. A resilient bushing unit 148 surrounds pivot bolt 146 within collar 144 so as to provide a limited amount of relative movement between the arm 124 and skid 138 in several directions during flexing of cutterbar assembly 128.

Cutterbar assembly 128 further includes a series of rectangular, sloping support panels 154 (FIGS. 12 and 16) along the rear edge of cutterbar 130 over the full width of the header (with the exception of the center conveyor yet-to-be described). Panels 154 overlie the front ends of the arms 124 and are attached by bolts 156 along their front edges to a transverse series of generally Z-shaped, formed members 158. Members 158, in turn, are secured at their front extremities to the rear edge of cutterbar 130 by bolts 160. Bolts 156 also serve to attach and support a series of slightly Z-shaped hold down elements 161 to the members 158 for the purpose of partially overlying and holding down the front edges of belts of the draper assemblies as hereinafter explained in more detail.

Each of the arms 124 can pivot independently of the others about its own rear pivot 126. However, all of the arms 124 are also floatingly supported by a common flotation system broadly denoted by the numeral 162 for lightening the load on the skids 138. Such flotation system could take a number of different forms such as, for example, springs, air bags, or hydraulic cylinders.

Each arm 124 has a rearwardly projecting extension 164 to which the selected type of flotation device may be attached. Extension 164 is fixed to a transversely extending hub 166 that receives pivot 126 and is fixed to the rear end of the arm 124. A pair of end-to-end, resilient bushing units 167 (FIG. 22) are housed within hub 166 and surround pivot bolt 126. In the particular embodiment disclosed herein, extension 164 at its rearmost extremity has a hydraulic, fluid pressure flotation cylinder 168 secured thereto, which is, in turn, connected at its upper end to the corresponding upright member 108.

In a preferred embodiment, flotation cylinders 168 are single-acting cylinders arranged such that as cylinders 168 are extended by hydraulic pressure, they force extensions 164 downwardly and thus the front ends of arms 124 upwardly, tending to lift or lighten cutterbar assembly 128. In one preferred embodiment, flotation cylinders 168 are connected in a parallel fluid flow relationship with a source of hydraulic pressure (not shown) such that, while all of the cylinders 168 are exposed to the same pressure, movement of one cylinder such as during flexing of the cutterbar assembly 128 does not necessarily result in movement of a neighboring cylinder 168. The flotation system may be such that arms 24 may be hydraulically locked in a raised position as shown in FIGS. 14 and 16 with skids 138 off the ground to permit crop severance at an elevated level. As an alternative to the hydraulic lock, suitable mechanical means may also be provided.

As illustrated, for example, in FIG. 10, draper mechanism for header 100 includes a pair of left and right, center discharge draper assemblies 170 and 172 located between cutterbar assembly 128 and frame 102. Draper assemblies 170, 172 are driven in opposite directions in such a manner that they are adapted to feed severed crop material laterally in an inboard direction toward a central discharge opening 174 between opposite inboard ends of draper assemblies 170,172.

Using right draper assembly 172 as an example, each draper assembly 170, 172 includes a pair of opposite end rollers 176 and 178 (FIG. 12) extending generally fore-and-aft between the rear wall panels 110 and cutterbar assembly 128. Rollers 176, 178 lie in the same plane as, extend parallel to, and are supported by their next adjacent arms 124. For example, with respect to inboard roller 178, the adjacent arm 124 has a pair of front and rear brackets 180 and 182 adjacent opposite fore-and-aft ends thereof that rotatably support roller 178. At the outer end of draper assembly 172, the outermost arm 124 supports drive 150, but the next inboard arm 124 has a pair of transversely extending, telescopically adjustable, cantilevered bars 184 and 186 that rotatably support opposite ends of roller 176. Bars 184, 186 can be adjustably lengthened or shortened by appropriately turning an operating rod 190 having a rack and pinion type coupling with bars 184, 186, all of which is for the purpose of adjusting the tension of draper assembly 172.

The outboard roller 176 is driven by a drive mechanism 192 that includes a pair of intermeshing bevel gears 194 and 196 that permit roller 176 to swing up and down with its supporting arm 124 about the pivot 126 of that arm without disengaging drive mechanism 192. Drive mechanism 192 is operably coupled with an input drive shaft 198 that extends across the right rear portion of header 100, which drive shaft 198 is also operably coupled with sickle drive 150 for the purpose or providing operating power to right draper assembly 172 and the right sickle bar half. A similar drive shaft 200 extends across the left rear half of header 100 (FIG. 11) for supplying driving power to left draper assembly 170 and the left sickle bar half.

Each draper assembly 170, 172 further includes an endless, flexible draper belt 202 entrained around opposite end rollers 176, 178 and presenting an upper run 202$a$ and a lower run 202$b$. The upper run 202$a$ of each belt 202 overlies all of the arms 124 associated with the draper assembly (except for the most outboard arm 124 that supports the drive for the corresponding sickle bar half), while the lower run 202$b$ underlies such arms 124. Thus, all of the arms 124 associated with each draper assembly are disposed within the draper belt 202, with the exception of the most outboard arm 124. The support panels 154 underlie the front portions of the draper belt 202 to assist in keeping belt 202 from sagging between arms 124 to a detrimental extent.

Draper belt 202 has a plurality of elongated, laterally spaced apart, fore-and-aft extending slats 204 thereon for increasing the feeding ability of belt 202. An upstanding, continuous rib 206 (FIGS. 16 and 19) is formed on the exterior surface of belt 202 adjacent the leading edge thereof and forwardly of the terminations of slats 204 for assisting in keeping belt 202 positioned properly in a fore-and-aft sense on rollers 176, 178. It will be seen that the hold down elements 161 overlie the front edge of belt 202 as illustrated in FIGS. 16 and 19 to likewise assist in properly maintaining the position of belt 202 on rolls 176, 178 and for providing a cover or shield over the front edge of belt 202 where crop materials might otherwise enter and fall through.

The discharge opening 174 between left and right draper assemblies 170, 172 is provided with a fore-and-aft conveyor 208 that receives severed materials from draper assemblies 170, 172 and transports them rearwardly toward outlet opening 112 in header frame 102. Conveyor 208 is disposed lower than draper assemblies 170, 172 so severed materials always drop onto conveyor 208 upon leaving draper assemblies 170, 172. Conveyor 208 is adapted to move up and down at its front end with the flexing cutterbar assembly 128 and proximal portions of draper assemblies 170, 172 so as to maintain a constant recessed relationship with the proximal inboard ends of draper assemblies 170, 172, notwithstanding changes in the terrain.

Conveyor 208 includes a pair of fore-and-aft extending, laterally spaced apart side plates 210 (FIGS. 18, 19 and 20) that rotatably support a pair of front and rear rollers 212 and 214 respectively. Additionally, conveyor 208 includes an endless, flexible belt 216 entrained around rollers 212, 214 and having a series of crop-engaging slats 218 thereon. A formed metal panel 220 spans the two side plates 210 between rollers 212, 214 and inside of conveyor 208 to help rigidify the assembly and to prevent untoward sagging of the top run 216$a$ of belt 216. The rear drive shaft 222 associated with rear roller 214 is rotatably supported in a fixed position relative to lower beam 106 by mounting lugs 224 (FIG. 20) fixed to beam 106. Bearing assemblies 226 in the two side plates 210 rotatably receive drive shaft 222 and permit conveyor 208 to pivot up and down about the axis of drive shaft of 222. A floor panel 228 of conveyor 208 extends between side plates 210 below the lower run 216$b$ of belt 216 and projects forwardly beyond side plates 210 for connection with a number of the ground skids 138 via sliding connections 230 (FIG. 19). Thus, when the skids 138 associated with the front end of conveyor 208 encounter terrain changes, conveyor 208 swings up or down as the case may be about the axis of rear drive shaft 222.

Figure 20:
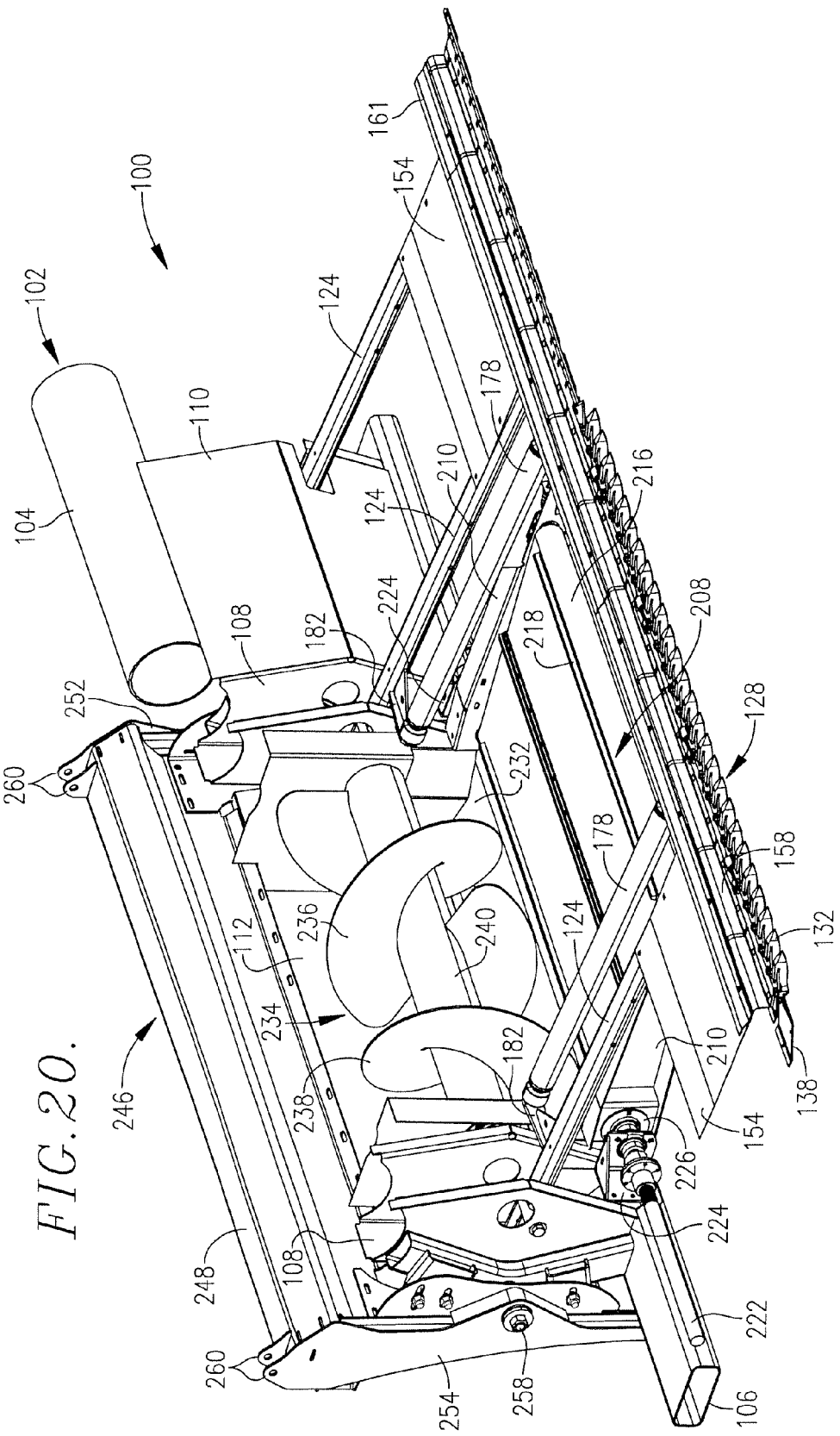
FIG. 20 is a fragmentary, right front isometric view of the central conveyor of the header of FIG. 10 with portions of the header removed to reveal details of construction.
Figure 21:
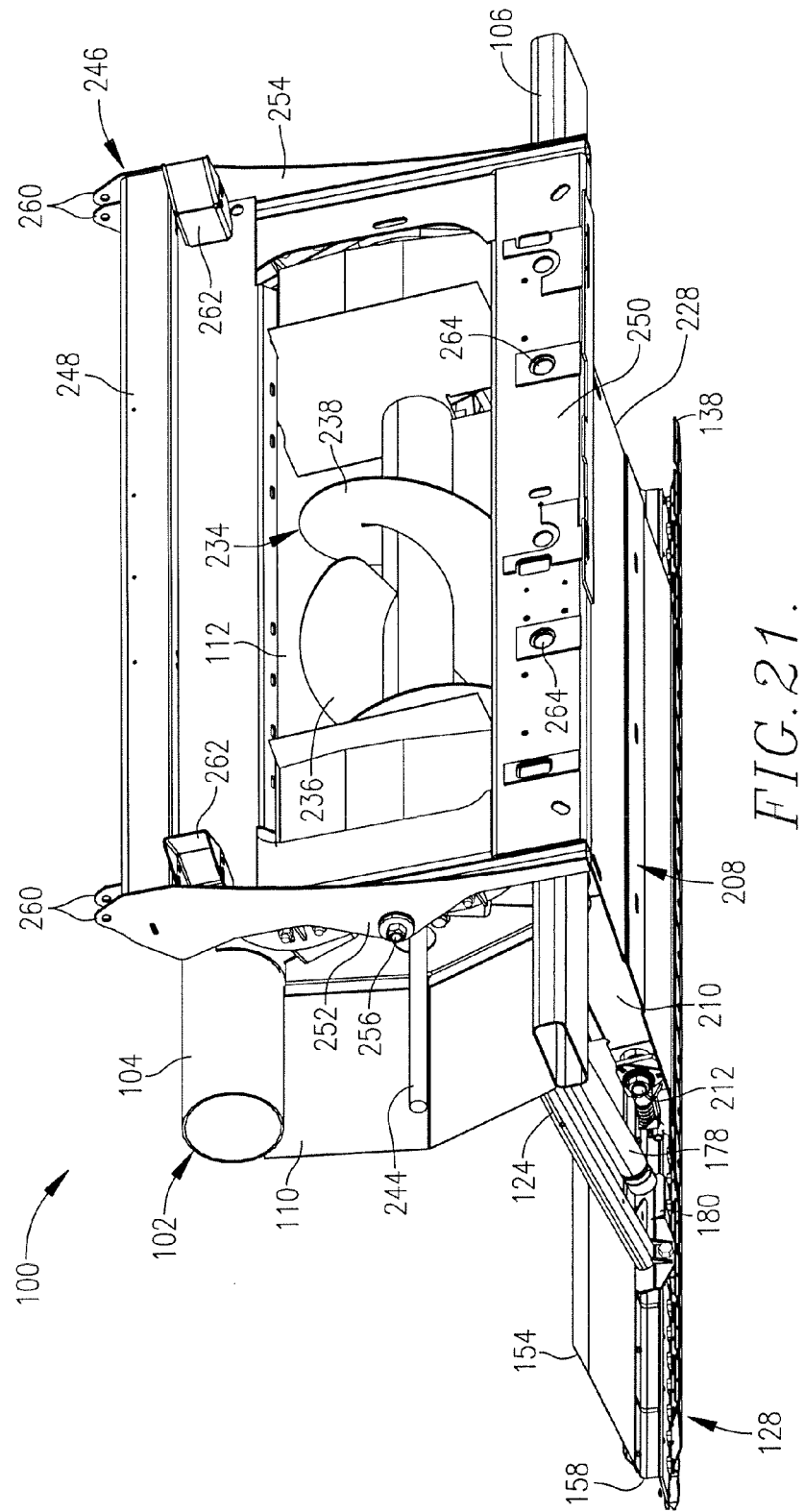
FIG. 21 is an enlarged, fragmentary, left rear isometric view of the header of FIG. 10 showing the mounting adaptor frame of the header.

The rear end of conveyor 208 terminates just forwardly of the discharge outlet 112 within header frame 102 (FIGS. 18 and 20). A stationary floor pan 232 (FIG. 18) within discharge outlet 112 extends rearwardly from the rear end of conveyor 208 to a point rearwardly of header frame 102. Pan 232 thus serves as a transition surface for flow of crop materials from header 100 into the front end of a feederhouse (not shown) on the combine to which header 100 is attached. A center-gathering, transverse auger 234 is disposed within outlet opening 112 and partially overlies both the rear end of conveyor 208 and transition floor pan 232 to help compress and feed the flow of materials rearwardly through outlet opening 112 and into the feederhouse. Left and right, oppositely inclined vanes 236 and 238 on the tube 240 of auger 234 help with these functions and also help consolidate the materials centrally. A drive shaft 242 within tube 240 of auger 234 is operably connected with a drive line 244 (FIGS. 11 and 21) carried by a pair of the upright members 208 on the left side of outlet opening 112, which drive line 244 is in turn operably coupled with the left input drive shaft 200 across the rear of header frame 102.

Header 100 is adapted for attachment to the feederhouse of a combine through the provision of an adaptor frame or bracket 246 (FIGS. 2, 20 and 21) that is permanently attached to the rear of header frame 102 in generally surrounding relationship to outlet opening 112. Adaptor bracket 246 is of rectangular, open box-like construction, presenting a horizontally extending top beam 248, a horizontally extending bottom beam 250, and a pair of left and right, generally upright side beams 252 and 254 respectively. Side beams 252, 254 rigidly interconnect top and bottom beams 248 and 250. Side beams 252, 254 are situated on opposite lateral sides of outlet opening 112, while top and bottom beams 248, 250 are situated above and below opening 112.

Adaptor bracket 246 is permanently attached to the rear of header frame 102 by a pair of left and right pivots 256 and 258 extending between side beams 252, 254 and the upright frame members 108 adjacent outlet opening 112. Pivots 256, 258 are located generally midway between the upper and lower extremities of side beams 252, 254. One or more turnbuckles or the like (not shown) may be provided between lugs 260 on top beam 248 and lugs 261 on upper beam 104 of header frame 102 for the purpose of allowing the angular relationship between adaptor frame 246 and header frame 102 to be adjusted. Thus, when adaptor frame 246 is secured to the feederhouse of a combine, the tilt of the header 100 can be adjusted relative to the feederhouse by correspondingly adjusting the turnbuckles.

Top beam 248 is provided with mounting pockets 263 (FIG. 18) similar to the mounting pockets associated with the first embodiment for matingly receiving corresponding upwardly projecting mounting structure on the feederhouse. A pair of rearwardly projecting guides 262 are fixed to respective ones of the side beams 252, 254 just below top beam 248 for the purpose of embracing opposite sides of the feederhouse and aligning outlet opening 112 with the mouth of the feederhouse. Multiple sets of receiving sockets 264 (FIG. 21) are located within bottom beam 250 for receiving corresponding mounting projections on the feederhouse in an arrangement that depends upon the particular brand of combine harvester to which header 100 is attached.

Operation

Header 100 may be operated either in a lowered position (FIG. 13) in which ground skids 138 ride lightly along the ground, or in a raised position (FIG. 14) in which skids 138 are out of contact with the ground. In the raised condition, which is more suitable for harvesting taller, small grain crops, the flexibility of cutterbar assembly 128 is not an issue as all parts of cutterbar assembly 128 are maintained constantly at the same height. Left and right draper assemblies 170, 172, and center conveyor 208 are disposed in raised positions like cutterbar assembly 128 inasmuch as the front ends of draper assemblies 170, 172 and conveyor 208 are all connected to cutterbar assembly 128. As noted earlier, cutterbar assembly 128 may be held in its selected raised position either hydraulically through suitable hydraulic lock mechanism in association with flotation cylinders 168 or mechanically through means not illustrated, or a combination of both.

Assuming that header 100 is being operated in its lowered position with skids 138 engaging the ground, the flotation system 162, including cylinders 168, lightens the load on skids 138 to the extent selected by the operator. As skids 138 encounter rises or depressions, they are either lifted by the rise or allowed to drop into the depression as the case may be. Different portions of cutterbar assembly 128 are allowed to react to changes differently than other portions inasmuch as support arms 124 are free to pivot upwardly about the rear pivots 126 generally independently of one another. Corresponding portions of the left and right draper assemblies 170, 172 also flex upwardly or downwardly in concert with proximal portions of the cutterbar assembly 128 so as to maintain a constant height relationship between cutterbar assembly 128 and left and right draper assemblies 170, 172. The front end of central conveyor 208 also flexes upwardly and downwardly with its corresponding portions of the cutterbar assembly 128 to stay in a constant height relationship therewith.

Consequently, draper assemblies 170, 172 and center conveyor 208 are always in an appropriate position to receive materials cut by sickle bar 136 or materials that might be knocked free of their stems during severance and engagement by the reel. Moreover, it will be appreciated that the distance between the cutoff point at sickle bar 136 and the front edge of draper assemblies 170, 172 is shorter than is the case, for example, with respect to a construction wherein the draper assemblies do not flex with the cutterbar. In the header 100, the transition area between sickle bar 136 and draper assemblies 170, 172 can be relatively short because cutterbar assembly 128 and draper assemblies 170, 172 are all moving up and down together. Thus, less crop loss can be expected, better feeding and control of the severed materials can be obtained, and productivity is increased. Moreover, the overall front-to-rear dimensions of header 100 can be decreased compared to conventional designs, which provides numerous efficiencies in manufacturing and transport.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A harvesting header operable to harvest crop, said harvesting header comprising:
a header frame;
a flexible cutterbar assembly mounted to the header frame to extend lengthwise in a lateral direction relative to the normal direction of travel of the header;
a plurality of laterally spaced apart support arms being attached to and cooperatively supporting the flexible cutterbar assembly,
said support arms being pivotally coupled to the frame for swinging movement about a laterally extending axis so that the flexible cutterbar assembly is operable to flex along the length thereof in response to changes in terrain as the header is advanced;
a draper assembly including a side draper carried on multiple ones of the support arms so as to flex with the cutterbar assembly, said side draper including an endless flexible draper belt configured to receive severed crop materials from the cutterbar assembly and convey the materials laterally, said draper belt presenting laterally endmost margins, with upper and lower crop-conveying runs extending between the margins; and pivoting structure mounted relative to the header frame at a rear pivot location so that the pivoting structure projects forwardly from the rear pivot location, said pivoting structure being positioned intermediate the endmost margins of the draper belt and between the upper and lower runs so as to pivot as the side draper flexes with the cutterbar assembly, said pivoting structure being devoid of a roller.

2. The harvesting header as claimed in claim 1,
said draper belt presenting leading and trailing edges that define a belt width dimension therebetween,
said pivoting structure being at least substantially coextensive with the belt width dimension.

3. The harvesting header as claimed in claim 1,
said pivoting structure projecting forwardly to a location adjacent the cutterbar assembly.

4. The harvesting header as claimed in claim 3,
said pivoting structure being attached to the cutterbar assembly.

5. The harvesting header as claimed in claim 1,
said multiple ones of the support arms including an inboard support arm positioned between the endmost margins,
said pivoting structure being at least part of the inboard support arm.

6. The harvesting header as claimed in claim 5,
said pivoting structure comprising the inboard support arm.

7. The harvesting header as claimed in claim 1,
said pivoting structure comprising a support assembly that includes at least one of the support arms and a support panel carried on the at least one support arm, with the support panel being configured to engage the underside of the draper belt,
said support panel projecting laterally outboard from the at least one support arm.

8. The harvesting header as claimed in claim 7,
said support panel presenting a groove that receives the guide rib therein.

9. The harvesting header as claimed in claim 1,
said draper assembly including another side draper carried on other multiple ones of the support arms so as to flex with the cutterbar assembly,
said another side draper including another endless flexible draper belt configured to receive severed crop materials from the cutterbar assembly and convey the materials laterally,
said draper assembly including a fore-and-aft draper located between the side drapers,
said side drapers operable to convey the severed crop materials from the cutterbar assembly laterally to the fore-and-aft draper.

10. The harvesting header as claimed in claim 1,
said endmost margins of the draper belt being supported on a corresponding roller, with each roller being carried by a respective one of the support arms, each of said respective one of the support arms extending in a fore-and-aft direction between the crop-conveying runs to carry the roller.

11. The harvesting header as claimed in claim 1,
said pivoting structure being pivotally mounted to the header frame at the rear pivot location.

12. The harvesting header as claimed in claim 1,
said multiple ones of the support arms including an inboard support arm positioned between the endmost margins,
said pivoting structure comprising a laterally-supporting pivot arm that is pivotally coupled to the frame at a location spaced laterally from the inboard support arm, with the pivoting structure being positioned between the endmost margins,
said pivot arm being coupled to the inboard support arm spaced from the location so as to extend therebetween and thereby restrict lateral movement of the inboard support arm.

13. A harvesting header operable to harvest crop, said harvesting header comprising:
a header frame;
a flexible cutterbar assembly mounted to the header frame to extend lengthwise in a lateral direction relative to the normal direction of travel of the header;
a plurality of laterally spaced apart support arms being attached to and cooperatively supporting the flexible cutterbar assembly,
said support arms being pivotally coupled to the frame for swinging movement about a laterally extending axis so that the flexible cutterbar assembly is operable to flex along the length thereof in response to changes in terrain as the header is advanced;
a draper assembly including a side draper carried on multiple ones of the support arms so as to flex with the cutterbar assembly,
said side draper including an endless flexible draper belt configured to receive severed crop materials from the cutterbar assembly and convey the materials laterally,
said draper belt presenting laterally endmost margins, with upper and lower crop-conveying runs extending between the margins; and
laterally stationary pivoting structure mounted relative to the header frame at a rear pivot location so that the pivoting structure projects forwardly from the rear pivot location and is generally restricted from moving along the lateral direction,
said pivoting structure being positioned intermediate the endmost margins of the draper belt and between the upper and lower runs so as to pivot as the side draper flexes with the cutterbar assembly.

14. The harvesting header as claimed in claim 13,
said draper belt presenting leading and trailing edges that define a belt width dimension therebetween,
said pivoting structure being at least substantially coextensive with the belt width dimension.

15. The harvesting header as claimed in claim 13,
said pivoting structure projecting forwardly to a location adjacent the cutterbar assembly.

16. The harvesting header as claimed in claim 15,
said pivoting structure being attached to the cutterbar assembly.

17. The harvesting header as claimed in claim 13,
said multiple ones of the support arms including an inboard support arm positioned between the endmost margins,
said pivoting structure being at least part of the inboard support arm.

18. The harvesting header as claimed in claim 17,
said pivoting structure comprising the inboard support arm.

19. The harvesting header as claimed in claim 13,
said pivoting structure comprising a support assembly that includes at least one of the support arms and a support panel carried on the at least one support arm, with the support panel being configured to engage the underside of the draper belt,
said support panel projecting laterally outboard from the at least one support arm.

20. The harvesting header as claimed in claim 19,
said support panel presenting a groove that receives the guide rib therein.

21. The harvesting header as claimed in claim 13,
said draper assembly including another side draper carried on other multiple ones of the support arms so as to flex with the cutterbar assembly,
said another side draper including another endless flexible draper belt configured to receive severed crop materials from the cutterbar assembly and convey the materials laterally,
said draper assembly including a fore-and-aft draper located between the side drapers,
said side drapers operable to convey the severed crop materials from the cutterbar assembly laterally to the fore-and-aft draper.

22. The harvesting header as claimed in claim 13,
said endmost margins of the draper belt being supported on a corresponding roller, with each roller being carried by a respective one of the support arms,
each of said respective one of the support arms extending in a fore-and-aft direction between the crop-conveying runs to carry the roller.

23. The harvesting header as claimed in claim 13,
said pivoting structure being pivotally mounted to the header frame at the rear pivot location.

24. The harvesting header as claimed in claim 13,
said multiple ones of the support arms including an inboard support arm positioned between the endmost margins,
said pivoting structure comprising a laterally-supporting pivot arm that is pivotally coupled to the frame at a location spaced laterally from the inboard support arm, with the pivoting structure being positioned between the endmost margins,
said pivot arm being coupled to the inboard support arm spaced from the location so as to extend therebetween and thereby restrict lateral movement of the inboard support arm.

\* \* \* \* \*